United States Patent
Shpizel

(10) Patent No.: US 7,036,935 B2
(45) Date of Patent: May 2, 2006

(54) LIGHT PROJECTION APPARATUS FOR PROJECTION IN THREE-DIMENSIONS

(76) Inventor: Matvey B. Shpizel, 1835 83rd St. Apartment 3A, Brooklyn, NY (US) 11214

( * ) Notice: Subject to any disclaimer, the term of this patent is extended or adjusted under 35 U.S.C. 154(b) by 110 days.

(21) Appl. No.: 10/397,052

(22) Filed: Mar. 25, 2003

(65) Prior Publication Data
US 2004/0189957 A1   Sep. 30, 2004

(51) Int. Cl.
*G03B 21/28* (2006.01)
*G02B 27/22* (2006.01)
*G02B 27/24* (2006.01)

(52) U.S. Cl. .............................. 353/10; 353/37; 353/99; 359/478; 348/51

(58) Field of Classification Search ................. 353/10, 353/28, 37, 50, 62, 97–99, 7; 359/298, 318, 359/197–205, 220, 221, 223–226, 478, 479, 359/462; 348/51
See application file for complete search history.

(56) References Cited

U.S. PATENT DOCUMENTS

| 3,287,081 | A | * | 11/1966 | Baltacis | 352/84 |
| 3,315,563 | A | * | 4/1967 | Harper et al. | 359/226 |
| 3,600,076 | A | * | 8/1971 | Synder | 353/20 |
| 4,217,040 | A | * | 8/1980 | Longerbeam | 353/46 |
| 4,956,655 | A | * | 9/1990 | Wakebe | 353/101 |
| 5,860,721 | A | * | 1/1999 | Bowron et al. | 353/101 |
| 6,183,088 | B1 | * | 2/2001 | LoRe et al. | 353/7 |
| 6,412,972 | B1 | * | 7/2002 | Pujol et al. | 362/272 |
| 6,487,020 | B1 | * | 11/2002 | Favalora | 359/619 |
| 6,765,566 | B1 | * | 7/2004 | Tsao | 345/419 |
| 2003/0223043 | A1 | * | 12/2003 | Yoshino | 353/10 |

* cited by examiner

*Primary Examiner*—W. B. Perkey
*Assistant Examiner*—Andrew Sever
(74) *Attorney, Agent, or Firm*—Marsh Fischmann & Breyfogle, LLP

(57) ABSTRACT

An apparatus and method are provided for producing images having a depth or relief component (e.g., appearing three-dimensional) from single perspective projection masks. The three-dimensional relief images are generated from two-dimensional images utilizing a simplified electromechanical device. In this regard, an oscillating light redirecting system is used to synthesize a third dimension onto a two-dimensional image resulting from projecting light through a single perspective projection mask. The light redirecting system controllably deflects the light projecting through the projection mask about two axes prior to the resulting image being projected on a surface. When projected onto a surface, the resulting image is controllably spread over two axes such that it appears to be a three-dimensional relief image. In a further embodiment, color filtering is utilized in order to produce color three-dimensional relief images.

51 Claims, 3 Drawing Sheets

LIGHT PROJECTION APPARATUS FOR PROJECTION IN THREE-DIMENSIONS

FIELD OF THE INVENTION

The present invention relates to light projection devices utilized for projecting images onto projection surfaces such as screens. In particular, the present invention relates to an electromechanical device for producing color images having a depth or relief component (e.g., appearing three-dimensional) from single perspective projection masks.

BACKGROUND

Projection devices are utilized in a variety of settings. These devices include video production equipment, motion picture projection equipment and lens projection systems. Typically, these devices are utilized to produce full-color single perspective (i.e., two-dimensional) images. However, in some applications it is desirable to generate images that provide the illusion of depth or relief images. That is, in some instances it is desirable to generate images that appear three-dimensional.

Video production equipment and motion picture projection equipment can be utilized to produce full-color three-dimensional relief images. However, these three-dimensional systems are typically large, complex and expensive. Accordingly, these systems are not well suited for applications such as advertising or generating background images for use in theater or concert settings. In contrast, lens projection systems, which utilize a light source to project a light beam through a projection mask and one or more lens, are typically compact, mechanically simple and relatively inexpensive. These projection masks are generally partially translucent slides or silhouette type images.

While lens projection systems are well suited for many applications, difficulty arises in utilizing these systems to generate three-dimensional relief images. However, in some instances, lens projection systems may be adapted generate three-dimensional relief images. For example, stereoscopic projection systems project pairs of individual picture elements having separate perspectives corresponding to the perspective offered by the right and left eyes of a viewer. The individual picture elements are generally taken from two different points of view and each eye of the viewer receives only the information obtained from one point of view when viewing the projected images on a screen. Accordingly, viewers may have to wear specialized glasses to view such images. In any case, such stereoscopic projection systems require multiple projection units and/or multiple perspective views of an image to generate a three-dimensional relief image and are accordingly complex and expensive.

Other lens projection systems have been adapted to provide an illusion of depth from a single projected image obtained from only one point of view. Such systems often utilize optical separators to separate light from a light source into a number of individual light bands. Optical generators may also be utilized to generate a plurality of optical images from the individual light bands, which may then be recombined to form a single image. Re-combination typically involves utilizing polarizing filters in order to shift one or more light bands, oriented in a first direction, relative to other light bands, that may be oriented in other directions, such that the illusion of depth is created in the recombined image. These systems typically rely upon complex electronics and polarizing light filters that result in images that have reduced brightness and/or clarity as well as poor color contrast. Again, these systems tend to be complex and for many applications prohibitively expensive.

SUMMARY OF THE INVENTION

It is an objective of the present invention to provide a simplified electromechanical light projection device for generating a three-dimensional relief image from a single perspective projection mask.

Another objective is to provide a device operable to generate three-dimensional relief images having improved image brightness.

A further objective is to provide an inexpensive three-dimensional projection system.

These and additional advantages are indeed realized by the present invention wherein relief images (hereinafter three-dimensional images) are generated from single perspective (hereinafter two-dimensional) projection masks utilizing a simplified electromechanical device. In this regard, an oscillating light redirecting system is used to synthesize a third dimension onto a two-dimensional image that results from projecting light through a projection mask. The light redirecting system controllably deflects the light projecting through the projection mask about two axes prior to the resulting image being projected on a surface, such that the resulting image is three-dimensional relief image. Generating such images does not require multi-perspective views of an image, utilization of specialized viewing glasses to view the resulting image, or use of polarizing filters that may reduce image brightness. The device and method allow for the generation of three-dimensional relief images in a cost effective simplified manner.

According to a first aspect of the present invention, a light projection device for generating three-dimensional relief images from two dimensional projection masks is provided. The device includes a lens projection system aligned with a light source. In this regard, the light source and one or more lenses of the lens projection system are in optical communication along an optical pathway, which may be folded in one or more places. That is, the light source, which may include a reflector (e.g. parabolic), is operative to focus light through one or more of the lenses (e.g., collecting lenses, focusing lenses etc.) along the optical pathway in order to project an image onto a projection surface such as a screen.

A projection mask holder is utilized for disposing a projection mask between the light source and at least a portion of the lens projection system along the optical pathway. As will be appreciated, when a projection mask (e.g. a GOBO mask) defining a two-dimensional image is placed into the optical pathway between the light source and one or more of the projection system lenses, the projection mask will generate a corresponding two-dimensional image when projected onto a surface.

In order to generate a three-dimensional relief image from the two-dimensional image, the present aspect utilizes a light redirecting device for redirecting the light beam emanating through at least a portion of the lens projection system after passing through a projection mask. In addition to redirecting the light beam (i.e. folding the optical pathway), the redirector is operable to controllably oscillate about first and second axes of oscillation. Accordingly, this oscillation spreads the light beam over first and second bands coinciding with the axes of oscillation. When the first and second axes are transverse, the two axis controlled oscillation of the redirecting device spreads the modulated light beam of the two-dimensional image along two separate bands. This synthesizes a third dimension onto the two-dimensional image when projected onto a projection surface. In this regard, the projection device utilizes a simple lens projection system and an oscillating two-axis redirecting device to generate a three-dimensional relief image. Accordingly, a compact and cost effective three-dimensional light projection device may be provided without the use of polarizing filters that may affect image clarity and/or brightness.

In one embodiment, the light redirecting device will comprise first and second redirecting devices which are each operative to controllably oscillate about a single axis. In this embodiment, the light beam deflected by the first redirector over a first band is received by a second redirector, which is again operative to deflect the light beam while controllably oscillating around a second axis, thereby further spreading the light beam over a second band coinciding with the second axis of oscillation. The first and second redirectors may be any device operable to controllably oscillate about at least one axis in order to redirect a light beam from a first optical axis to a second optical axis. That is, reflective devices as well as refractive devices may be utilized.

In one embodiment where a reflective surface is incorporated, each oscillating redirector is disposed at a 45° angle relative to the incoming light beam. That is, the angle of incidence between the light beam and reflective surfaces of each redirector is 45°. In any case, the first light redirector is operative to deflect the light beam to the second redirector. In a further embodiment, the first light redirector is disposed between at least first and second lenses within the lens projection system. In this regard, the light beam redirected by the first redirector passes through at least one lens on its way towards the second redirector. The lens disposed between the redirectors may be a focusing lens operable to move along an axis extending between the redirectors such that the resulting projection may be properly focused. Furthermore, in this embodiment the second redirector may be disposed beyond the lens projection system. That is, the second redirector may deflect the light beam towards the projection surface without the light beam passing through another lens, though this is not a requirement.

In order to synthesize the third-dimension, the redirection of the light beam about two axes must be coordinated. In particular, the oscillation of the redirecting device may be controlled such that it oscillates about the first and second axes in a fixed relation. For example, the oscillation frequencies and/or oscillation amplitudes about the first and second axes may have to be substantially equal in order to generate three-dimensional images. Additionally, in order to provide enhanced image control, the oscillation frequency about each axis may be shifted in phase. More preferably, this phase shift between the oscillation axis may be selectively controlled between about 0–90°. However, it will be appreciated that if multiple oscillating redirectors are utilized within the system, other oscillation phase, frequency, and/or amplitude relationships may be applicable.

In order to produce full color three-dimensional relief images, the device may further include a color light filter. This color light filter may be a single-color light filter, thereby producing single color light projections. However, in a preferred embodiment an RGB light filter is utilized with the system such that projections of any color may be created. In this regard, an RGB light filter may be disposed in the optical pathway between the light source and the projection mask, or, anywhere between the light source and the redirecting device such that the light passing through the two-dimensional image defined by the mask is modulated by the color filter. In any case, the RGB light filter is operable to sequentially dispose red, blue, and green filters within the optical pathway at a controlled rate. In one particular embodiment, the RGB filter is operable to sequentially dispose translucent red, green, and blue filters into the optical pathway in conjunction with the oscillation frequency about the first and second axes. By altering the rotation frequency of the RGB filter, images of any color may be generated. As will be appreciated, as the light passes directly through the translucent color filters, image brightness is not impaired as in reflective and/or polarizing filter projection devices.

In order to generate movement of the projected three-dimensional image, the projection mask holder may also be operable to rotate the projection mask or, utilize a plurality of projection masks. For example, the projection mask holder may be operable to controllably rotate the projection mask about one or more axis such that the image resulting from light passing through the projection mask is altered. As will be appreciated, the resulting three-dimensional projection will likewise be altered. Furthermore, the projection mask holder may be operable to sequentially orient a plurality of projection masks into the optical pathway such that a plurality of three-dimensional images are produced for viewing. In this regard, depending on the speed and sequence of the projection masks, three-dimensional animated images may be projected. Furthermore, in one embodiment, an LCD matrix projection mask may be integrated into the system. In this regard, the LCD matrix may be operable to generate any two-dimensional figure or series of figures for disposition between the light source and the deflectors, thereby allowing for dynamic generation of multiple two-dimensional masks that are then synthesized into three-dimensional images.

According to a second aspect of the present invention, a method for generating three-dimensional relief images from a two-dimensional projection mask is provided. The method includes projecting light through a two-dimensional image and at least a portion of the light projection system to generate a light beam modulated by the two-dimensional image. This light beam is deflected in an oscillating manner over first and second axes to spread the beam over first and second bands. Typically, these bands will be transverse and more preferably, perpendicular. Once deflected over the first and second bands, the light beam is projected onto a projection surface wherein the original image of the two-dimensional image is spread over first and second axes to generate a three-dimensional relief image on the projection surface.

Oscillatingly deflecting the light beam over first and second bands having first and second axis can be performed concurrently or in series. That is, the light beam may be initially deflected over a first band aligned with the first axis. Then the resulting band may be deflected over a second band aligned with a second axis. In any case, the light beam of the two-dimensional image is spread over first and second bands having transverse axes. In order to generate a three-dimensional image, the oscillating steps may performed having equal oscillation frequencies and/or equal oscillation amplitudes. However, to provide added three-dimensional image manipulation, the oscillation about the first and second axis may be shifted in phase.

In a further embodiment, the method of the present aspect may incorporate modulating the light projected through the projection mask and/or lens projection system with a color filter in order to produce color three-dimensional images. In a preferred embodiment, this will entail modulating the light with an RGB color filter in order to produce three-dimensional images of any selectable color. In a preferred embodiment, modulation comprises passing light through the translucent filter as opposed to utilizing a reflective-type filter in order to maintain image clarity and contrast.

In a further embodiment of the present invention, light may be projected through a plurality of projection masks in sequence in order to generate a corresponding plurality of three-dimensional images. That is, in order to generate a desired effect, such as animation, a series of related projection masks may be disposed in a predetermined sequence. In this regard, three-dimensional animated images may be generated.

DETAILED DESCRIPTION

The present invention provides a light projection device that is operative to project three-dimensional full color images synthesized from images defined by two-dimensional projection masks. In this regard, the light projection device utilizes an electromechanical system to synthesize a third dimension, or, Z coordinate onto a two-dimensional image separated by focusing light through a projection mask. The light projection device is the electromechanical equivalent of a video projection device utilized to create three-dimensional images, however, the device of the present invention has a simple optical arrangement, is compact and has a reduced cost compared to existing three-dimensional projection devices.

Figure 1:
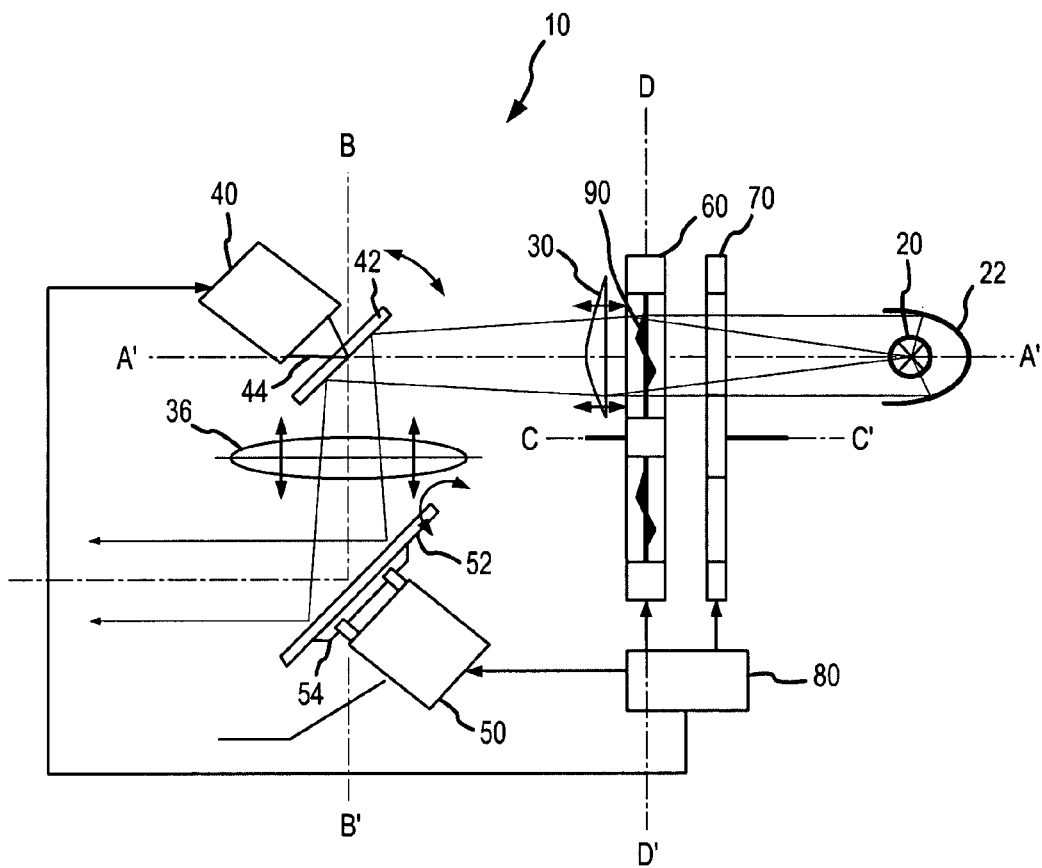
FIG. 1 shows one embodiment of the light projection system.

As shown in FIG. 1, the light projection device 10 consists essentially of a standard lens projection system that includes a light source 20, a projection mask holder 60, a collecting lens 30, and a focusing lens 36. Each of these components is aligned along an optical pathway such that light emitting from the light source 20, which may be enhanced utilizing a reflector 22, is modulated by a projection mask held within the projection mask holder 60 to create a light beam image defined by the projection mask. This light beam is gathered by the collecting lens 30, focused by the focusing lens 36, and projected onto a projection surface such as a screen. As will be appreciated, one or both of the lenses may be adjustable relative to the optical pathway to allow the resulting image to be properly focused. As shown, the light projection device 10 further incorporates first and second single axis reflective-type deflectors 40, 50 in the optical pathway that are utilized to synthesize a third coordinate for what would otherwise be a two-dimensional projection image created by passing light through the projection mask. Furthermore, an RGB filter 70 is incorporated into the device between the light source and the projection mask holder 60 such that full color, three-dimensional images may be synthesized.

Each single axis light deflector 40, 50 includes a mirror 42, 52 operable to controllably oscillate about a single axis 44, 54. As shown, the first deflector 40 oscillates its mirror 42 about a first axis 44 (i.e. perpendicular to the page as shown). This first deflector 40 is disposed along a first optical axis A–A' within the projection device 10 and is optically aligned with the collecting lens 30, the projection mask holder 60, the RGB filter 70, and the light source 20. The first deflector 40 is utilized to deflect the light beam, received from the collecting lens, which is modulated by both the RGB filter 70 and a projection mask 90, through a focusing lens 36 to the second deflector 50 along a second optical axis B–B'. That is, the first deflector 40 folds the optical pathway. In conjunction with deflecting the light beam through the focusing lens 36 towards the second deflector 50, the first deflector 40 oscillates its mirror 42 about the first oscillation axis 44 such that the light beam deflected through the focusing lens 36 and towards the second deflector 50 is deflected over a single axis band, as will be discussed herein.

Once the light beam is deflected by the first deflector 40 through the focusing lens 36, the light beam is deflected towards a projection surface (not shown) by the second deflector 50. The mirror 52 of the second deflector 50 oscillates about a second axis 54 and deflects the received light beam (which is deflected over a single axis band by the first deflector 40) over a second band in direction corresponding to the second oscillation axis 54. In this regard, the light beam is redirected from the second deflector 50 towards a projection surface, is deflected in two bands about two axes. As shown, the first and second deflectors 40, 50 are operable to deflect the light beam into bands having perpendicular axes. For example, the first deflector 40 may deflect the light beam about a Y axis, whereas a second deflector 50 may deflect the light beam about an X axis. That is, in the preferred embodiment, the first and second deflectors 40, 50 are utilized to deflect the light beam over substantially perpendicular axes in order to synthesize a three-dimensional image from a two-dimensional projection. However, these axes need not necessarily be perpendicular to synthesize a third dimension to the light beam. Furthermore, in the embodiment shown, the mirrors 42, 52 of the first and second deflectors 40, 50 are disposed at equal 45° angles relative to the incidence of the received light flux to reduce distortion of the projected image, however, this is not a requirement.

Figure 2:
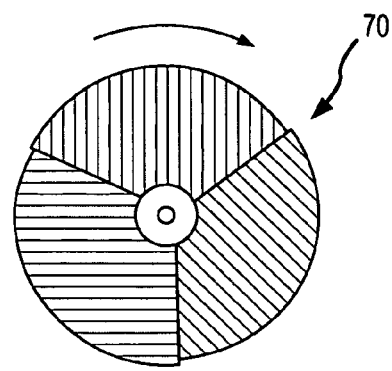
FIG. 2 shows an RGB filter utilized with the light projection device of FIG. 1.

FIG. 2 shows the RGB color filter 70 utilized with the light projection device 10. As shown, the RGB filter 70 contains three equal red, green, and blue translucent slides that are controllably disposed between the light source 20 and the projection mask holder 60. In this regard, the RGB filter 70 is mounted on an axis of rotation C–C' such that the RGB filter 70 may be controllably rotated to modulate the light between the light source and projection mask holder 60. As noted, use of the RGB filter 70 allows for generation of full color projections, however, single color filters may also be utilized to generate mono-color projections.

Figure 3A:
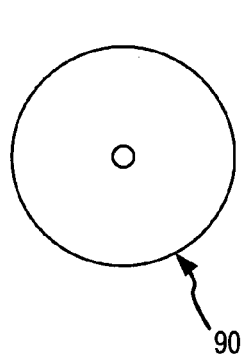
FIGS. 3A, 3B, and 3C show a first projection mask, the resulting projection after a first axis deflection, and the resulting projection after a second axis deflection, respectively.
Figure 3B:
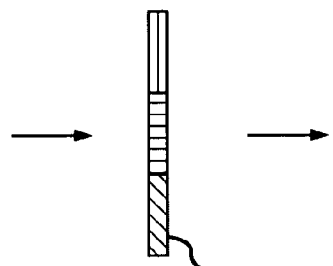
Figure 3C:
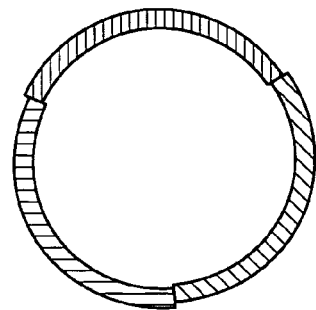

FIGS. 3A–3C show a projection mask, a resulting light beam from the projection mask after deflection by the first deflector 40, and the resulting image after deflection by the second deflector 50 onto a projection surface, respectively. FIGS. 3A–3C illustrate utilization of the projection device 10 to controllably alter a first two-dimensional projection image into a second two-dimensional projection image. As shown in FIG. 3A, the projection mask is a GOBO projection mask (i.e. a projection image cut out of metal). Using a GOBO mask allows the projection mask 90 to withstand high temperatures that may be produced by the light source 20, though this is not a requirement.

The mask 90 of FIG. 3A defines a centrally and symmetrically located circular opening. The image that results from passing light through the RGB filter 70 and projection mask 90 would normally be a two-dimensional circular dot. However, utilizing the projection device of the present invention, the first deflector 40 deflects the light beam along a single axis generating a light band 92 as shown in FIG. 3B. In the embodiment shown, the first deflector 40 is oscillated in a controlled sequence with the rotation of the RGB filter 70 such that the resulting light band 92 has red, green, and blue sections. That is, the RGB filter rotates at an equal frequency of the first detector. As such, the red, blue, and green color bands are distinctly defined. However, it will be appreciated that by altering the rotation frequency of the RGB filter 70 that any color may be produced. In any case, this light band 92 is deflected through the focusing lens 36 and deflected by the second deflector 50. As noted, the second deflector 50 deflects the light band 92 along a second axis (e.g., perpendicular to the first axis) thereby generating an RGB-colored circle from the original dot in the projection mask 90.

In order to convert the image from the projection mask 90 into the RGB-color circle, the deflector oscillation frequencies and amplitudes of the first and second deflectors 40, 50 are equal and shifted in phase by 90° (i.e., π/4). Furthermore, and as noted above, controllably rotating the RGB-filter 70 allows the color of the resulting three-dimensional image to be selectively controlled. Typically, rotation of the RGB filter 70 will be related to the deflector oscillation. In one preferred embodiment, the rotation of the RGB filter 70 is described by the equation:

$$F_D = A_S * 2^n, \text{ where } n=0, 1, 2, 3, \ldots$$

where $F_D$ is the rotation frequency of the RGB 70 filter and $A_S$ is the oscillation frequency of the first and second deflectors 40, 50. Accordingly, an electronic control 80, may be incorporated into the device 10 to coordinate such rotation and oscillation frequencies.

Figures 4A, 4B, 4C:
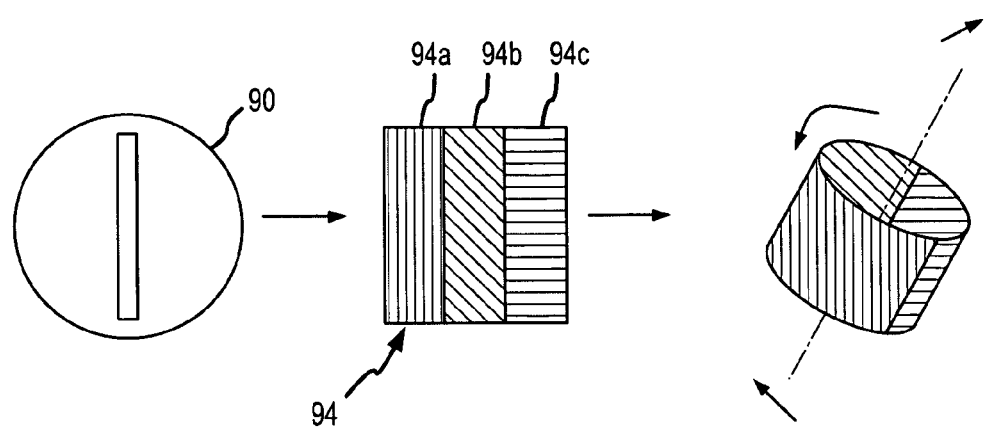
FIGS. 4A through 4C show a second embodiment of a projection mask, resulting light projection after first axis deflection, and the resulting three-dimensional projection after second axis deflection.

FIGS. 4A–4C show the utilization of the light projection device 10 to synthesize a third dimension to a two-dimensional projection image, thereby creating a three-dimensional projection from a two-dimensional projection mask. As shown in FIG. 4A, the projection mask 90 has a centrally located slot. Light passing through the RGB filter 70 and the projection mask 90 is received by the first deflector 40, which deflects the resulting light flux along a first axis (e.g., Y axis) into a plane 94 of three RGB bands A–C as shown in FIG. 4B. The three light bands 94A, 94B and 94C are deflected through the focusing lens 36 to the second deflector 50. The second deflector 50 transforms the plane 94 into a cylinder as shown in FIG. 4G. As shown, the resulting cylinder 96 is a three-dimensional representation of the two-dimensional projection mask 90. Again, to generate the three-dimensional representation of the two-dimensional projection mask 90, the oscillation frequencies and amplitudes of the first and second deflectors 40, 50 are equal and shifted in phase by 90°. The shape of the cylinder (i.e. length, diameter, etc.) may be changed by changing the oscillation frequencies and/or amplitudes of the first and second deflectors 40, 50. That is, the oscillation frequencies of each deflector 40, 50 while being equal may be adjusted in phase to alter the resulting image. That is, the phase difference between the deflectors 40, 50 is adjustable between 0° to 90° to allow for additional image manipulation.

Though shown using two simplified examples in FIGS. 3A–3C and FIGS. 4A–4C, it will be appreciated that the projection mask 90 may have any shape or logo and that the resulting three-dimensional color projections may have any foreshadowing or color dynamics as projected onto a viewing screen. As discussed above, the light projection device 10 utilizes a simplified electromechanical system to generate three-dimensional images. However, as will be discussed herein, additional componentry may be utilized with the light projection device 10 to allow for generation of movement in accordance with synthesizing three-dimensional projections.

The cylinder shown in FIG. 4C produced from the projection mask 90 of FIG. 4A may be rotated in space by controllably rotating the projection mask 90 within the projection mask holder 60. That is, as shown in FIG. 1, the projection mask 90 may be rotated about a vertical axis D–D'. Accordingly, this rotation results in a change in the light beam that is received by the deflectors 40, 50, which results in a corresponding modification of the resulting three-dimensional projection. Furthermore, multiple projection masks 90 may be utilized in series to create a series of three-dimensional projections that, depending on their presentation, may result in three-dimensional animation. For example, as shown in FIG. 1, the projection mask holder 60 includes a carriage operable to rotate about an axis of rotation C–C' that is operable to hold a plurality of projection masks 90. Accordingly, these projection masks may be sequentially rotated into the optical axis A–A' extending between the light source and the first deflector 40. Alternatively, the projection mask holder 60 and projection mask 90 may be replaced by a liquid crystal matrix such that the light from the light source 20 passes through the liquid crystal matrix. Accordingly, the liquid crystal matrix may be operable to synthesize any two-dimensional image, or, a series of two-dimensional images that may then be deflected in accordance with the present invention to generate three-dimensional images thereof.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A three dimensional light projection device, comprising:
   a lens projection system aligned with a light source relative to a defined optical pathway;
   a-projection mask holder for disposing a GOBO projection mask in said optical pathway between said light source and at least a portion of said lens projection system;
   a light redirecting device for redirecting light from said at least a portion of said lens projection system in an oscillating manner relative to first and second axes prior to projection onto a projection surface.

2. The device of claim 1, wherein said lens projection system utilizes at least a first and second lenses.

3. The device of claim 2, wherein at least one of said first and second lenses comprises a focusing lens.

4. The device of claim 3, wherein said focusing lens is moveable along said optical pathway.

5. The device of claim 2, wherein at least a portion of said light redirecting device is disposed between said first and second lenses, wherein said portion of said light redirecting device redirects light through one of said first and second lenses.

6. The device of claim 5, wherein said light redirecting device comprises first and second redirecting devices, wherein one of said first and second lenses is disposed between said first and second redirecting devices.

7. The device of claim 1, wherein said light redirecting device comprises first and second redirecting devices disposed at separate points on said optical pathway.

8. The device of claim 7, wherein said first and second redirecting devices redirect said light in an oscillating manner relative to first and second axes, respectively.

9. The device of claim 8, wherein said first and second axes are transverse.

10. The device of claim 1, wherein said light redirecting device oscillates relative to said first and second axes at equal frequencies.

11. The device of claim 1, wherein oscillation relative to said first and second axes is shifted in phase.

12. The device of claim 11, wherein said shift in phase is adjustable between 0° and 90°.

13. The device of claim 1, wherein said light redirecting device oscillates relative to said first and second axes with an equal oscillation amplitude.

14. The device of claim 1, wherein said redirecting device includes a reflective surface.

15. The device of claim 14, wherein said reflective surface is disposed 45° relative to an angle of incidence of said optical pathway.

16. The device of claim 1, further comprising:
a light filter disposed between said projection mask holder and said light source in said optical pathway.

17. The device of claim 16, wherein said light filter comprises an RGB light filter.

18. The device of claim 17, wherein said RGB light filter is operable to sequentially dispose red, blue and green filters in said optical line of sight at a controlled rate.

19. The device of claim 18, wherein an oscillation frequency of said redirecting device, FD, and a sequential disposition rate of said RGB filter, AS, is coordinated, where $FD = AS*2n$,
wherein n is one of zero and a positive integer.

20. The device of claim 17, wherein said RGB light filter is operable to sequentially dispose red, blue and green filters between said projection mask holder and said light source at a controlled rate.

21. The device of claim 1, wherein said projection mask holder is operable to rotate GOBO a projection mask about a first axis.

22. The device of claim 1, wherein said projection mask holder is operable to sequentially hold a plurality of GOBO projection masks between said light source and at least a portion of said lens projection system.

23. The device of claim 1, further comprising:
an LCD matrix projection mask being operable to synthesize a plurality of two dimensional images.

24. A method for generating three-dimensional projections from two-dimensional images, comprising the steps of:
projecting light through a projection mask and at least a portion of a lens projection system defining a light beam of a two-dimensional image defined by said mask;
first deflecting said light beam along a first axis using a first oscillating deflector; and
second deflecting said light beam received from said first deflector along a second axis using a second oscillating deflector, wherein said first and second deflecting are performed at equal oscillation frequencies; and
projecting said light beam onto a projection surface, wherein a resulting image is deflected along said first and second axes generating a relief image of said two-dimensional image.

25. The method of claim 24, further comprising:
using a first lens to focus said light projected through at least a portion of said lens projection system.

26. The method of claim 24, wherein said first deflecting comprises deflecting said light beam over a first band.

27. The method of claim 24, wherein said second deflecting comprises deflecting said light beam over a second band.

28. The method of claim 24, wherein said first deflecting and said second deflecting each comprises deflecting said light beam 90°.

29. The method of claim 24, wherein said first and second axes are transverse.

30. The method of claim 24, wherein said first and second deflecting are performed at equal oscillation amplitudes.

31. The method of claim 24, wherein said first deflecting and second deflecting performed at equal oscillation frequencies are shifted in phase between 0° and 90° relative to one another.

32. The method of claim 24, further comprising:
modulating said light beam with an RGB filter.

33. The method of claim 24, further comprising: projecting a color image onto said projection surface.

34. A three dimensional light projection device, comprising:
a lens projection system;
a projection mask holder for disposing a projection mask between a light source and at least a portion of said lens projection system;
a first oscillating deflector for deflecting a light beam from at least a portion of said lens projection system over a first band; and
a second oscillating deflector for deflecting said light beam from at least a portion of said lens projection system over a second band, wherein said first and second bands are transverse and wherein said first and second oscillating deflectors are shifted in phase between 0° and 90°.

35. The device of claim 34, wherein said first and second bands are substantially perpendicular.

36. The device of claim 34, wherein said first and second oscillating deflectors have equal oscillation frequencies.

37. The device of claim 34, wherein said first and second oscillating deflectors have equal oscillation amplitudes.

38. The device of claim 34, further comprising:
a light filter disposed between said projection mask holder and said light source.

39. A method for generating three-dimensional projections from two dimensional images, comprising the steps of:
sequentially disposing a plurality of two-dimensional projection masks defining a plurality of images between a light source and a lens projection system;

oscillating a light beam modulated by each said mask and passing through at least a portion of said light projection device over first and second bands, wherein said first and second bands are transverse and oscillation over each band is shifted in phase;

projecting said light beam oscillated over first and second bands onto a projection surface to project a three-dimensional image corresponding to each of said sequentially disposed plurality of projection masks.

40. The method of claim 39, wherein oscillating further comprises:
first oscillating said light beam over said first band; and
second oscillating said light beam over said second band.

41. The method of claim 40, wherein said first and second oscillating steps are performed having at least one of:
equal oscillation amplitudes;
equal oscillation frequencies; and
oscillations shifted in phase between 0° and 90°.

42. The method of claim 39, wherein projecting comprises projecting a sequence of three-dimensional images to produce a three-dimensional animated projection.

43. The method of claim 39, further comprising, modulating said light beam with a color filter to produce color three-dimensional images.

44. The method of claim 43, wherein said modulating with a color filter is color.

45. A three dimensional light projection device, comprising:
a lens projection system aligned with a light source relative to a defined optical pathway, said lens projecting system including at least a first lens and a second lens;
a projection mask holder for disposing a projection mask in said optical pathway between said light source and at least a portion of said lens projection system; and
a light redirecting device disposed between said first and second lenses for redirecting light from said at least a portion of said lens projection system in an oscillating manner relative to first and second axes prior to projection onto a projection surface, wherein said light redirecting device redirects light through one of said first and second lenses.

46. The device of claim 45, wherein said light redirecting device comprises first and second redirecting devices, wherein one of said first and second lenses is disposed between said first and second redirecting devices.

47. The device of claim 45, wherein said light redirecting device oscillates relative to said first and second axes at equal frequencies.

48. The device of claim 45, wherein oscillation relative to said first and second axes is shifted in phase.

49. The device of claim 45, further comprising:
an RGB light filter disposed between said projection mask holder and said light source in said optical pathway.

50. The device of claim 45, wherein said projection mask holder is operable to rotate a projection mask about a first axis.

51. The device of claim 45, wherein said projection mask holder is operable to sequentially hold a plurality of projection masks between said light source and at least a portion of said lens projection system.

* * * * *